Oct. 19, 1965   N. E. ANDERSON   3,213,261
TWO LENGTH GAP FUSION SPOT WELDING METHOD
Filed July 31, 1962   3 Sheets-Sheet 3

INVENTOR.
NELSON E. ANDERSON
BY Edmund W Bopp
Agent

United States Patent Office 3,213,261
Patented Oct. 19, 1965

3,213,261
TWO LENGTH GAP FUSION SPOT WELDING METHOD
Nelson E. Anderson, Berkeley Heights, N.J., assignor to Air Reduction Company, Incorporated, New York, N.Y., a corporation of New York
Filed July 31, 1962, Ser. No. 213,822
5 Claims. (Cl. 219—127)

My invention relates to fusion spot welding with particular reference to the use of a non-consumable electrode.

In accordance with the invention, the arc electrode does not touch the work part in striking the arc and, after striking the arc, the arc gap is lengthened to an operating arc gap sufficiently long to clear the finished surface of the work and to permit a filler wire to be introduced into the arc.

The invention is applicable to plug welding, that is, where the arc electrode heats a lower work part by extending into a prepared hole in an upper work part. It is equally applicable to a melt through process, that is, where the arc fuses through the upper work part into the lower work part.

The electrode may be preheated to ensure prompt arc starting. In many cases, continuous local heating of the electrode between and during spot welds is desirable so that the arc need not be left on between welds, will not have to be started from a cold condition, and will not sputter due to momentary failure during a weld.

It has been the practice to strike the arc by touching the electrode to the work part and withdrawing the electrode to an operating distance by moving the entire welding head. Touching the electrode to the work part, however, has the disadvantage that in many cases it contaminates the work part with substances evaporated from the electrode or present in the arc. Furthermore, moving the whole head removes the shielding gas nozzle from the desired protective position relative to the work parts and also requires a heavier moving mechanism than is required to move the electrode alone.

In plug welding, with the shielding gas nozzle in position close to or touching the work, the electrode in arc striking position extends into the hole in the upper work part as disclosed herein, where it may be allowed to dwell long enough to heat a massive lower work part without unduly heating the upper work part. Striking the arc with the electrode extending well into the hole and close to the surface of the lower work part reduces the tendency of the arc to strike upon the side of the hole or upon some other portion of the upper work part or other adjacent conductors, especially when the electrode is tapered at the arc supporting end. I have found a taper of one and one-half diameters of the electrode to be preferable. Undue heating of the upper work part is especially to be avoided when the upper work part is relatively thin compared to the lower work part. Regardless of the relative thickness of the upper and lower work parts, it is desirable that the arc should strike initially to the bottom of the hole in order to assure proper centering of the weld and adequate heating of the lower work part.

In melt through welding, the shielding gas nozzle may be positioned close to or touching the work as in the case of plug welding. In this case, the electrode in arc striking position is close to but not touching the upper work part.

In either of these types of welding, the electrode may be moved to operating arc position without moving the shielding gas nozzle. The electrode need be retracted only far enough to permit the filler wire to be fed into the arc and in the case of plug welding, to permit the electrode to clear the finished surface of the upper work part when the hole is filled with metal.

The filler wire is preferably fed in at a constant preset rate and retracted before the end of each welding operation. For this purpose, I use a constant speed motor which is adjustable to any desired speed, and clutches for connecting the motor to the wire feed mechanism through forward and reverse gearing, respectively.

An object of the invention is to move the electrode back and forth between an arc striking position, in which the electrode does not touch the work parts, and an operating position, in which filler wire may be fed into the arc, the electrode being moved without moving the welding head as a whole.

Another object is to heat a lower work part by dwelling an arc thereon while the electrode is in position within a preformed hole in an upper work part without unduly heating the upper work part and without ever touching the electrode to any work part.

Another object is to strike the arc to the lower work part through the hole without drawing an arc to the sides of the hole or to the upper work part.

Another object is to feed filler wire to the arc without disturbing a protective gas shield about the arc and without necessity for moving the gas nozzle toward or away from the work parts during any portion of the welding operation.

A further object is to reduce speed-up time for the wire feed and to maintain the rate of wire feed constant to a higher degree than is possible with present practice.

A feature of the invention is an improved degree of taper at the electrode tip which facilitates the starting and maintaining of the arc and which helps to reduce the tendency for the arc to strike to the side.

Other features, objects and advantages will appear from the following more detailed description of illustrative embodiments of the invention, which will now be given in conjunction with the accompanying drawings.

In the drawings,

FIGS. 1, 1–A and 2 are elevational views, partly in section and partly broken away, showing a welding machine head or gun embodying principles of the invention, FIGS. 1 and 1–A together forming a single view;

Figure 1:
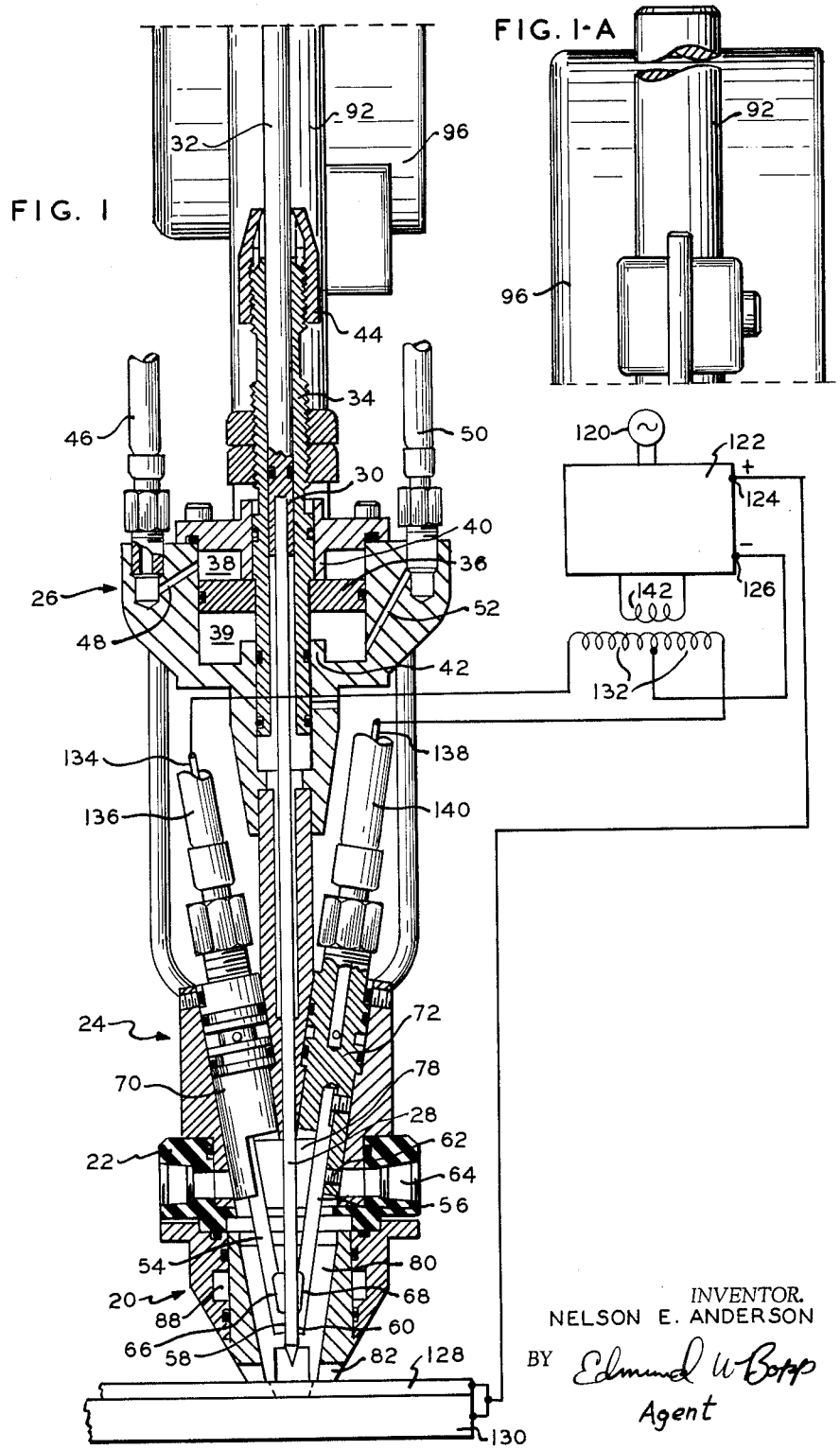

FIGS. 1, 1–A and 2 show a welding machine having a nozzle portion 20, electrically insulated by means of a collar 22 from a power cable receiving portion 24. Above and spaced from the portion 24 is an arc-electrode moving portion 26. A non-consuming electrode rod 28 is held in a socket 30 in the lower end of a cylindrical electrode holder 32. The member 32 extends through a hollow piston rod 34 which is rigidly attached to a piston 36 which is slidably enclosed in a pneumatic cylinder 38, 39, in the arc-electrode moving portion 26 between an upper stop 40 and a lower stop 42. The member 32 is clamped to the piston rod 34 as by means of a collet 44. Compressed air or other pressure medium may be fed into the portion 38 of the cylinder above the piston 36 through a conduit 46 and a passageway 48, and into the portion 39 of the cylinder below the piston 36 through a conduit 50 and a passageway 52.

The lower end of the arc electrode rod 28 extends into the nozzle portion 20 and is held in a fractional and electrically conductive engagement between a pair of power conductors 54 and 56. The tip portions 58, 60, of the conductors 54, 56, respectively, may be shaped to fit snugly around the rod 28 to provide good electrical contact. The pressure of the conductors 54, 56, upon the electrode 28 may be adjusted by means of set screws, one of which is shown at 62, accessible through a hole 64 in the collar 22. To increase the flexibility of the conductors 54, 56, a region of reduced cross-sectional area may be made at a place between the set screw and the tip portion as by forming a flat portion as shown at 66 and 68. The conductors 54 and 56 may be held in conductive members 70 and 72, respectively, which are securely held in the power cable receiving portion 24.

Shielding gas is supplied to the arc through a conduit 74 and a nozzle or jet 76 extending into the power cable receiving portion 24 and communicating with a passage 78 within the collar 22 and with passage 80 within the nozzle portion 20 where the stream of gas surrounds the electrode and the arc and exists through a slot 82. Coolant fluid such as water is supplied through a pair of inlet and outlet conduits 84, 86 and intermediate passages in the nozzle portion 20, including an annular passage 88 which is arranged to effect cooling of the nozzle portion.

The nozzle portion 20 is attached to or integral with a block 90 which is in turn attached to supporting rod 92. The latter may be mounted in any suitable manner, for example in a device capable of moving the entire welding device when desired. It will be noted, however, that the device as a whole need not be moved when it is desired only to change the distance between the arc sustaining tip of the electrode and the work, this movement of the electrode being effected by moving the piston 36.

Figure 6:
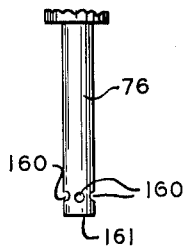
FIG. 6 is an elevational view of a nozzle or jet for non-turbulent introduction of shielding gas into the nozzle portion of a welding gun.

FIG. 6 shows in elevation the gas nozzle or jet 76 as preferably designed to provide non-turbulent flow of the gas through the passages in the nozzle portion 20 of the welding gun. The nozzle 76 is a hollow tube with holes 160 located in the side wall and with the end 161 closed off. The shielding gas issues laterally and in controlled manner from the holes 160 and is thus prevented from rushing straight down and setting up turbulence in the space below.

The block 90 houses feeding and driving means for supplying filler wire to the arc and to retract the filler wire when required. Filler wire 94 from a spool contained in a casing 96 mounted on the support 92 is threaded through a guide member 98 and between drive rolls 100, 102, and then through a guide tube 104 and around an idler wheel 106 to a guide shoe 108. The action of the wheel 106 and shoe 108 is to bend the filler wire and direct it into the arc. The wire feed mechanism may be of the form disclosed in U.S. Patent 3,009,619, issued Nov. 21, 1961 to L. M. Layden, entitled Wire Feed Mechanism. I prefer to drive the wire feed mechanism with a constant speed motor, the speed of which may be adjusted to a desired constant value, and to connect the motor as needed by means of clutches, one clutch arranged to impart forward feed to the wire and another to impart reverse feed to retract the wire from the vicinity of the arc. I also prefer to provide the motor with a brake, and to operate the clutches and the brake automatically according to a predetermined program, except for the initial threading of the wire, which is best done under manual control.

Figure 2:
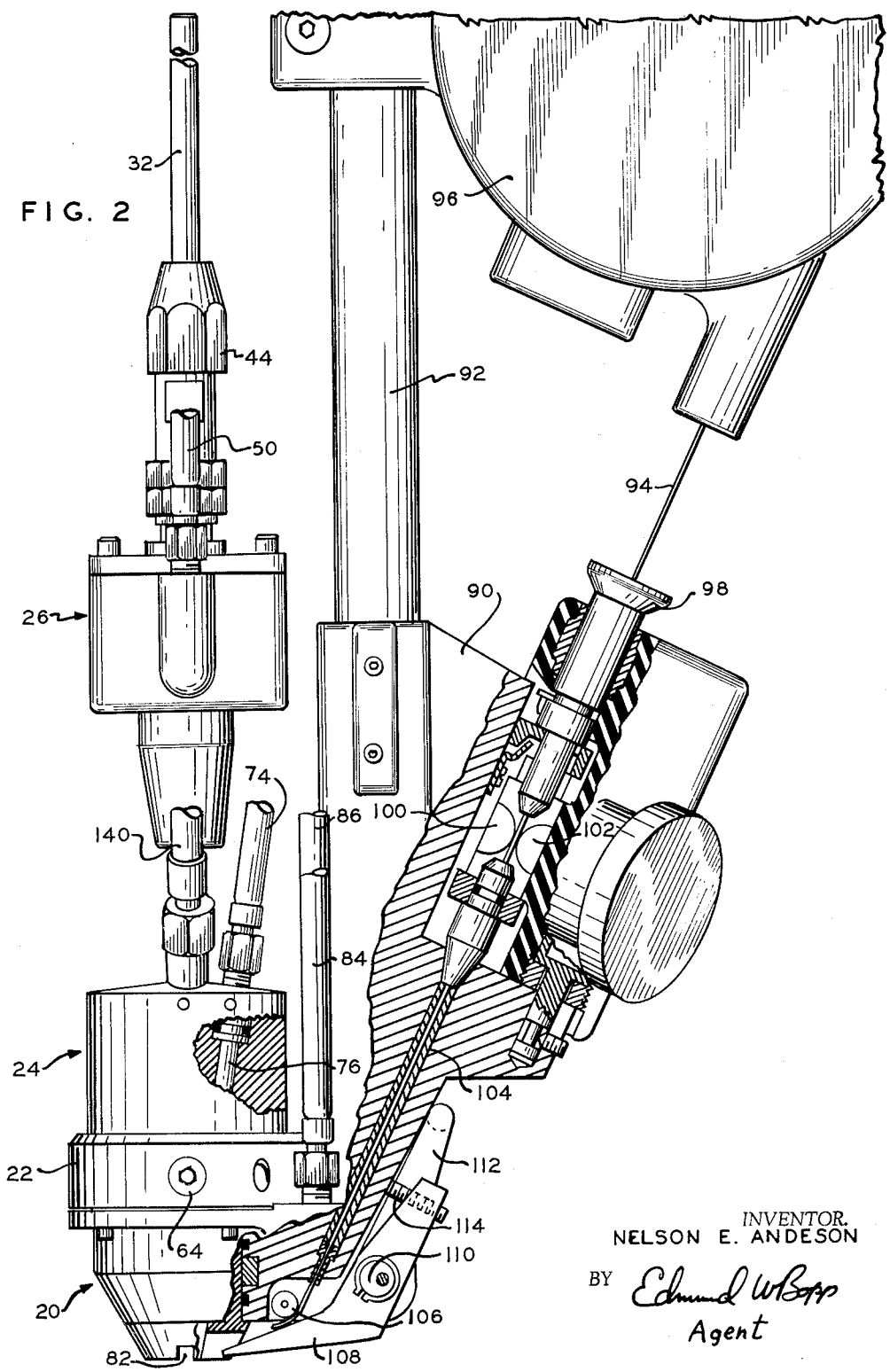
Figure 3:
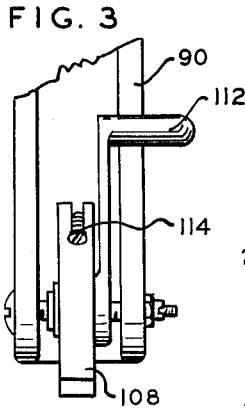
FIG. 3 is a fragmentary elevational view of a portion of the machine shown in FIGS. 1 and 2 comprising means for advancing and retracting a guide shoe for guiding a filler wire to the vicinity of the welding arc.

FIGS. 2 and 3 shows a mounting for the shoe 108 whereby the shoe may be moved out of the way sufficiently to facilitate initial threading of filler wire from the spool to a point beyond the wheel 106. For this purpose, the shoe 108 is mounted upon an eccentric shaft 110 which may be turned by hand by means of a handle 112, thereby withdrawing the shoe 108 a short distance from the position of the arc. With the shoe in the retracted position, the filler wire may be advanced past the wheel 106 until the wire strikes the shoe 108, whereupon the shoe may be returned to the operating position close to the arc. As the shoe is advanced toward the arc, the filler wire is bent to conform to the upper surface of the shoe and is guided thereafter by the shoe to the vicinity of the arc. If it were not for the retraction of the shoe as described, the filler wire, being stiff, could not readily be forced past the wheel and over the upper surface of the shoe. The thrust of the wire against the shoe is resisted in either position of the shoe by a set screw 114 which is threaded in a notched portion at the upper end of the shoe and strikes against the block 90. To control small movements of the filler wire in the threading operation, the forward and reverse clutches may each be operated manually by means of push buttons.

Power is supplied to the arc from any suitable source, for example from a source 120 of 60 cycle alternating current. The source 120 is connected to an assemblage of circuits shown as a block 122 which may contain a magnetic amplifier, rectifier, power distribution circuits, control devices and programming means, of the general type disclosed in the application of William J. Greene, Ser. No. 51,107, filed Aug. 22, 1960 and entitled Regulated Power Supply. The assemblage of circuits in the block 122 may vary from the circuits shown in Ser. No. 51,107 as described and will include a rectifier output circuit having a positive terminal 124 and a negative terminal 126 which are shown in FIG. 1 as extending out from the block 122. The power circuit for the arc extends from the positive terminal 124 to workparts which are shown as an upper workpart 128 and a lower workpart 130. From the workparts the power circuit extends through the arc to the electrode 28 and thence in parallel paths to a transformer winding 132 and thence by way of a center tap on the winding 132 to the negative terminal 126. One of these parallel paths is through the conductor 54, the conductive member 70, the central conductor 134 of a power cable 136 to one end of the winding 132, while the other parallel path is through the conductor 56, the member 72 and the central conductor 138 of a power cable 140 to the other end of the winding 132. The members 70 and 72 may be given an insulating coating or insulated from the power cable receiving portion of the machine in any suitable manner, for example, the insulating coating may be what is known in the trade as Martin hard coating.

Power for pre-heating the arc electrode may also be derived from the circuits in block 122 and extended to a transformer winding 142 which winding forms the primary of a transformer for which the secondary is the winding 132. The path for heating current extends serially from the winding 132 through the cable conductor 134, the member 70, the conductor 54, a relatively small portion of the electrode 28 comprised between the contact surfaces 58 and 60, the conductor 56, the member 72 and the cable conductor 138. This circuit serves to heat the electrode tip independently of whether or not the arc is in operation. There are many advantages in such preheating or auxiliary heating of the electrode, many of which are disclosed in my U.S. Patent No. 3,030,495, issued Apr. 17, 1962 entitled Initiation and Maintenance of Power Arcs, assigned to the assignee of the present application. The heating arrangement disclosed herein has the additional advantage that the heating is localized in a relatively small part of the electrode close to the arc-sustaining tip of the electrode. The electrode is heated in proportion to the resistance of the portion of the electrode between the contact surfaces 58, 60, augmented by contact resistance between the electrode and the conductors 54 and 56.

Figure 4:
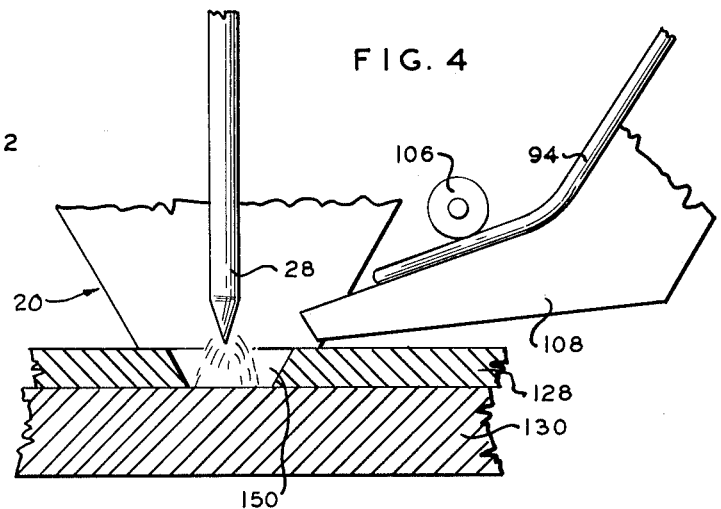
FIG. 4 is a cross-sectional view showing the relationship of arc electrode, workparts and filler wire with the electrode in lowered position and the filler wire retracted.

FIG. 4 shows a preferred relationship of arc electrode and workparts in the early stage of a plug welding operation. The arc electrode 28 is shown in the lowered position. The tip of the electrode is within the hole 150 in the upper workpart 128, and close to the upper surface of the lower workpart 130. The arc extends from the electrode tip to the upper surface of the workpart 130 and does not impinge upon the upper workpart 128 or on the sides of the hole 150. In this position, the arc is readily struck, particularly in the presence of suitable pre-heating of the electrode. The arc may be allowed to dwell sufficiently long to properly heat a lower, relatively massive workpart to insure a good weld, and, in the case of a relatively thin upper work part, without unduly heating the upper workpart.

FIG. 4 shows the filler wire 94 in retracted position and shows how the filler wire is bent by the cooperation of the wheel 106 and the shoe 108 and directed toward the arc, the handle 112 being up and the shoe 128 in its advanced position closest to the arc.

Figure 5:
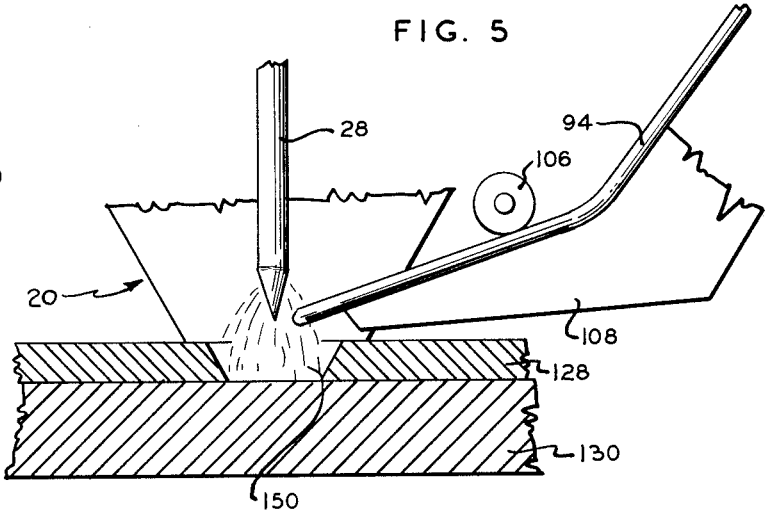
FIG. 5 is a view similar to that of FIG. 4 except that the arc electrode is in the raised position and the filler wire is extended into the vicinity of the arc.

FIG. 5 shows the electrode 28 in the raised position and the filler wire projected into the arc, the filler wire having been fed past the wheel 106 and guided by the shoe 108. The raised position of the electrode 28 provides room for the filler wire to be advanced into the arc as required.

As shown particularly in FIGS. 4 and 5, the nozzle portion 20 is not moved when the arc electrode is raised or lowered and may remain in the same position during the entire welding operation. The bottom of the nozzle may rest upon the workpart inasmuch as the nozzle portion 20 is electrically insulated from the power arc and heating circuits by the insulating collar 22. The bottom of the nozzle has the groove 82 which permits the escape of the shielding gas at all times during the welding operation.

The invention is equally applicable to either plug welding or melt-through welding. In the latter case, the hole in the upper workpart is not made and the arc is allowed to dwell upon the upper workpart long enough to melt through the upper workpart and to melt sufficiently into the lower workpart to effect a proper weld between the two workparts. In this case, filler wire may or may not be used, according to whether or not weld reinforcement is required. In either type of welding in the welding stainless steel, for example, an upper workpart as thin as one-hundredth of an inch may be used without undue heating.

There are various ways of adjusting the limiting arc lengths corresponding to the arc electrode raised and the arc electrode lowered. For this purpose, the gripping position of the collet 44 relative to the electrode holder 32 may be varied. Alternatively, the length of the electrode may be changed. It is also possible, by regulating the pressures applied above and below the piston 36 to stop the piston at any desired position without driving the piston against either or both of the stops 40, 42.

To facilitate arc starting and to avoid striking the arc to the upper workpart or to the side of the hole, I use a tapered electrode with a preferred degree of taper of length equal to one and one-half times the diameter of the cylinder. An example of a suitable electrode for many uses is one composed of thoriated tungsten containing two percent of thorium and cylindrical in form with a diameter of one-eighth inch.

By using the electrode with preferred degree of taper and using a sufficiently short starting arc, it will in some cases be satisfactory to dispense with pre-heating of the electrode. In other cases, it will be desirable to use pre-heating and continuous auxiliary heating in order to benefit from the numerous advantages of this heating.

In programming the welding machine for spot welding, after providing coolant and shield gas, I prefer a sequence in which the arc electrode is lowered to striking position, time is measured for any desired dwell for heating the work, the electrode is raised to operating position, and the power supply to the arc is set for constant or slightly rising voltage during a measured initial welding period. During this period, filler wire may be fed into the arc for a definite length of time at a preselected feed rate and then retracted. When the weld is completed and filled, the power supply to the arc is switched to a tapering down voltage for a definite period. At the end of the taper, the shield gas and coolant are continued in supply for a sufficient additional time to allow the weld to cool at a desired rate while it is protected from contamination by the atmosphere. In some cases, a third adjustment of the power supply may be put into effect during a part of the welding operation, as for example, to offset cratering and cracking of the weld.

Hand operation is also feasible if desired, resting the nozzle upon the workpart and employing a manual control of the cylinder and piston for raising and lowering the electrode.

While illustrative forms of apparatus and methods in accordance with the invention have been described and shown herein, it will be understood that numerous changes may be made without departing from the general principles and scope of the invention.

What is claimed is:

1. The method of plug welding with an arc electrode comprising the steps of inserting the electrode through a pre-formed hole in the upper workpart to an arc starting position below the undisturbed upper surface of the upper workpart close to but spaced apart from the lower workpart, striking the arc substantially solely to the upper surface of the lower workpart with the electrode in said starting position, dwelling the arc substantially solely upon the upper surface of the lower workpart for a period with the electrode sustaining the arc while substantially in said arc starting position, retracting the electrode to a second arc sustaining position, and feeding filler wire to the arc in said second arc sustaining position to complete the weld.

2. The method according to claim 1, in which the electrode is held in a welding head and in which the electrode is retracted while holding the welding head as a whole in fixed position relatively to the workparts.

3. The method according to claim 1, in which in the electrode retracting step the amount of retraction is just sufficient to provide space for feeding filler wire to the arc.

4. The method of plug welding with a tapered electrode, comprising the steps according to claim 1.

5. The method of plug welding with a welding head in which an arc electrode is held which comprises the steps of resting the welding head upon or close to the upper workpart to be welded, extending the electrode relatively to said welding head into a pre-formed hole in said upper workpart to a position below the undisturbed upper surface of the upper workpart close to but spaced apart from the lower workpart to be welded, striking the arc between said electrode and substantially solely the upper surface of said lower workpart, dwelling the arc substantially solely upon the upper surface of the lower workpart for an interval with the electrode sustaining the arc while in the arc striking position to heat said lower workpart without unduly heating said upper workpart, raising said electrode relatively to said welding head to a second arc sustaining position permitting addition of filler material to said arc and above the finish level of said upper workpart, and introducing filler material into the arc while completing the weld.

(References on following page)

References Cited by the Examiner

UNITED STATES PATENTS

| | | | |
|---|---|---|---|
| 363,320 | 5/87 | Bernardos et al. | 219—127 X |
| 2,723,331 | 11/55 | Tyrner | 219—130 |
| 2,759,083 | 8/56 | Richter et al. | 219—130 |
| 2,862,101 | 11/58 | Klinke | 219—137 |
| 2,870,323 | 1/59 | Roper et al. | 219—137 |
| 2,892,925 | 6/59 | Butterfield et al. | 219—127 |
| 2,898,516 | 8/59 | Volff | 219—131 X |

RICHARD M. WOOD, *Primary Examiner.*

JOSEPH V. TRUHE, *Examiner.*